United States Patent [19]
Ciza et al.

[11] Patent Number: 5,568,266
[45] Date of Patent: Oct. 22, 1996

[54] COLORIMETER AND COLORIMETRICAL CONTROL DEVICE

[75] Inventors: Jean-Charles Ciza, Triels/Seine; Alain Moreno, Hermes, both of France

[73] Assignee: MTS Colorimetrie, Osny, France

[21] Appl. No.: 313,775

[22] Filed: Sep. 28, 1994

[51] Int. Cl.$^6$ ............... G01J 3/50; G01N 21/85; G01N 21/55

[52] U.S. Cl. .............. 356/402; 356/410; 356/445; 250/226

[58] Field of Search .................. 356/410, 411, 356/402, 437, 438, 403–409, 445–448; 250/226

[56] References Cited

U.S. PATENT DOCUMENTS

| | | |
|---|---|---|
| 3,088,479 | 5/1963 | Christie .................. 356/410 |
| 3,328,587 | 6/1967 | Brown et al. . |
| 3,867,040 | 2/1975 | Loffler et al. .................. 250/226 |
| 3,869,214 | 3/1975 | Egli et al. . |
| 4,197,013 | 4/1980 | Van Ackeren et al. .................. 356/438 |
| 4,403,866 | 9/1983 | Falcoff et al. . |
| 4,421,408 | 12/1983 | Davis et al. .................. 356/410 |
| 4,563,581 | 1/1986 | Perten .................. 356/445 |
| 4,583,858 | 4/1986 | Lebling et al. .................. 356/402 |
| 4,699,510 | 10/1987 | Alguard .................. 356/73 |
| 4,802,763 | 2/1989 | Gerlinger et al. .................. 356/319 |
| 4,919,535 | 4/1990 | Hohberg et al. .................. 356/429 |
| 4,977,522 | 12/1990 | David .................. 356/408 X |
| 5,001,938 | 3/1991 | Downie .................. 73/864.34 |
| 5,074,158 | 12/1991 | Tokoyama .................. 73/865.8 |
| 5,287,168 | 2/1994 | Poucher et al. .................. 356/410 |

FOREIGN PATENT DOCUMENTS

| | | |
|---|---|---|
| 0079517 | 5/1983 | European Pat. Off. . |
| 0081702 | 6/1983 | European Pat. Off. . |
| 0181228 | 5/1986 | European Pat. Off. . |
| 0279191 | 8/1988 | European Pat. Off. . |
| 0319375 | 6/1989 | European Pat. Off. . |
| 2417010 | 10/1975 | Germany . |
| 484144 | 5/1938 | United Kingdom .................. 356/437 |
| 2142721 | 1/1985 | United Kingdom . |

OTHER PUBLICATIONS

Technisches Messen TM, "Farbmessung und Farbregelung in der Papierproduktion", vol. 59, No. 5, May 1992, Muchen De, pp. 209–213.

Database WPI, Week 8925, Aug. 2, 1989, Derwent Publications Ltd., London, GB. Abstract only.

Database WPI, Week 9139, Nov. 13, 1991, Derwent Publications Ltd., London, GB. Abstract only.

*Primary Examiner*—K. Hantis
*Attorney, Agent, or Firm*—Greenblum & Bernstein P.L.C.

[57] ABSTRACT

A colorimeter is provided in which a measuring pipe diverts a sample of a substance off of a production line into a measuring chamber. A series of cut-off valves control the quantity of the sample accumulated in the measurement zone to ensure sufficient amount for analysis. An optical head having three concentrically aligned light projectors projects light onto the sample. Light reflected off the sample, the wavelength of which indicates the sample's color, is collected by an optical collection system and sent to a color analyzer for comparison with a predetermined color. The measurement chamber is provided with temperature, humidity and level sensors to account for shifts in wavelength due to these parameters.

12 Claims, 10 Drawing Sheets

COLORIMETER AND COLORIMETRICAL CONTROL DEVICE

The invention concerns a colorimeter used the colorimetrical on-line analysis of a fluid substance.

The invention also concerns a colorimetrical control device for producing a composite fluid substance of a pre-defined color.

Large scale production of different types of objects made of synthetic materials includes reproducing a certain color as precisely as possible. Taking into account the speed at which such production is carried out, the color analysis of an obtained object and the correction which may be necessary must be done in an extremely short period of time, and in such a way as to avoid any slowing down or interrupting the production flow.

The colorimetrical analysis of an object can be carried out with two different aims. First, identify the necessary composition of basic substances to obtain a composite substance of a pre-defined color, and thus a final object, also of a pre-defined color. Second monitor constantly the results obtained in order to intervene during production to correct the mixture of the composition.

As far as the present description is concerned, the term "fluid substance" includes pellets, such as are used, for example, in the production of objects made of synthetic material by injection moulding. This term also refers to powder substances, viscous fluid substances, and substances which do not have a homogenous consistency.

In a more general sense, the present invention also applies to on-line colorimetrical analysis of all substances flowing through a production line, as well as of product in the form of sheets. For example sheets of paper or sheets of synthetic material which will pass before the colorimeter. Let us bear in mind that the sensation of color of a substance depends on the specific nature of the substance, the light which illuminates it, and on the roughness of the surface illuminated by the light.

Furthermore, the sensation of the color produced by a substance depends on the characteristics of the eye of an observer or of an optoelectronic receiver.

The specific color of a substance or an object is represented usually by the light spectrum which the object or the substance reflects. A photospectrometer measures the percentage of light which the object reflects for each of the wavelengths of a spectrum.

In other respects, it must be borne in mind that the light spectrum of the light reflected by an object or by a substance may vary under the influence of characteristics such as, for example, the temperature or the humidity. This is of greater concern for pellets or powder substances.

In the same way, the roughness of the surface of an object or of a sample of pellets or a powder substance must be taken into account. Surface irregularities, and shadows which results therefrom, may alter the impression of the color and the wavelength spectrum of the reflected light.

Given that the distribution of the wavelengths of the light reflected by a given object or a given substance varies according to the type of light which illuminates the object or the substance, it is essential for every colorimetrical measurement to calibrate the colorimetrical measurement instrument.

The appreciation of a color also implies taking into account characteristics of the opto-electronic receiver. Depending to its physical constitution, and especially the photosensitive elements used, its sensitivity to the three basic colors of the visual trivariance, (red, green and blue) may vary.

In order to render the colorimetrical measurements as objective as possible, standard values have been defined to normalize a certain number of colors and to define a standard eye on the visible spectrum through three curves: red, green and blue.

While being quite simple in principle, the colorimeter has the disadvantage of requiring complex mathematical calculations. These calculations require the availability of significant computer memory to obtain measurement results rapidly without slowing production. Alternatively, one would have to rely on laboratory checks of staggered colorimetrical measurements with regard to the production in progress.

The optical properties of a colored sample also depend on the chemical constitution of a pigment, absorption of the light during which the light radiation is transformed into heat, scattering of the light causing the dispersion in space of part of the light radiation, and on the refraction factor differences between the pigment and the carrier, and, between the colored substance and the air.

In addition, a fraction of the incidental light is subject to an external reflection on reaching the surface of the colored body, which is partially glossy.

Another fraction of this light is absorbed by the measuring instrument, and lost. Still a third fraction, greater than the others, of the light scattered by the pigment reflects off the inner side of the object or on the particles of the pigment because of the refraction factor difference. This results in the need to correct the measurement result to obtain operational objective values for production.

SUMMARY OF THE OBJECTS OF THE INVENTION

In object of the invention is to propose suitable ways of overcome the aforementioned disadvantages.

A further object of the present invention is to provide a colorimeter which conducts an on-line colorimetrical analysis of a fluid substance. The invention concerns a colorimeter for the on-line colorimetrical analysis of a fluid substance. This colorimeter comprises a color measurement optical head connected to a color analysis device.

In conformity with the invention, the colorimeter also includes a measurement pipe which includes a cut-off device connected to at least one point in the measurement pipe, which allows a build-up of a sample of the fluid substance in a given measurement zone, and a window in relation to which the optical head is placed, the measurement pipe acting as a by-pass of a production line through which the fluid substance flows.

This disposition enables a portion-sample of the fluid substance to be analyzed, without slowing down or interrupting the flow of the fluid substance along the production line. At the same time, this permits the colorimetrical measurements on a stationary sample during an interval chosen according to the type of colorimeter used and the means of calculation available.

In addition, the duration of the measurement period can be chosen according to the frequency with which such measurements must be made.

The invention also concerns the following characteristics, in isolation or taken with all possible technical combinations:

The measurement pipe is connected to the production line at both ends.

This allows the fluid substance to be reintroduced, into the stream of the fluid substance flowing through the production line after the colorimetrical analysis has been made.

The measurement pipe comprises a level receiver, positioned in the upper part of the measurement zone, which enables the colorimetrical analysis cycle only when a given volume of the fluid substance is present in the measurement zone.

This disposition, notably in the case of an analysis of pellets or a powder substance, ensures that the colorimetrical measurements are made only when the fluid substance is well compacted, and therefore does not have a relatively clearer aspect than its specific color due to reduced density that the fluid substance has during filling of the measurement zone.

The measurement pipe is equipped with a temperature sensor.

The measurement pipe is equipped with a humidity sensor.

These last two dispositions enable, through corrections during the assessment of the measurement results, to take into consideration variation of aspects of the specific color of the fluid substance according to the degree of humidity or of the temperature.

The colorimeter comprises a control device connected to the measurement pipe cut-off device. This control device synchronizes the colorimetrical measurement cycle, with the opening and closing of the cut off device.

The optical head is mounted on an adjustable support of the measurement pipe to control the relative distance between the measured substance and the optical head.

This disposition allows the relative position of the optical head to be adjusted in relation to the measurement pipe within the installation constraints on the production line.

The colorimeter comprises an automatic calibration device which includes at least one to color reference (standard).

This disposition ensures the evaluation of measurements made in relation to a standard measurement, which provides a degree in standardization of measurement results.

The optical measurement head is connected to the color analysis device by fiber optics.

This disposition provides an optical head having reduced size, containing only optical and mechanical devices, and sensitive to temperature variations or other environmental parameters, to be placed at a distance from the measurement pipe.

In other respects, the optical head can comprise a hermetic pressurised sealed case. To maintain higher pressure inside the case avoids the deposit on the optical parts of dust or of particles of the substance to be analyzed.

The invention also concerns a colorimetrical control device which provides a composite fluid substance of a pre-defined color. This device comprises separate tanks of each of the elements forming the composite fluid substance, control devices for the quantity of each of these elements extracted from its tank, mixing devices of the extracted elements enabling the composite fluid substance to be obtained, a colorimeter for on-line colorimetrical analysis of this composite fluid substance, and a color measurement optical head connected to a color analysis device.

In conformity with the invention, the colorimetrical control device comprises a measurement pipe which includes a cut-off device in at least one point in the measurement pipe which allows a build-up of the sample of the fluid substance in a given measurement zone, and a window in relation to which the optical head is placed, the measurement pipe by-passing of a production line through which the fluid substance flows.

In further conformity with the invention, the colorimetrical control unit also comprises a processing and control device which receives the information supplied by the colorimeter and representative parameters of the pre-defined color, and which controls the flow of raw materials to obtain a composite fluid substance with the pre-defined color.

The colorimeter device of the invention is preferably a spectrophotocolorimeter for the spectrophotocolorimetrical analysis of the sample.

In a preferred embodiment of the colorimeter of the invention, it comprises a spectrophotocolorimeter comprising a light source for illumination of the sample, at least one reference standard and a reference light source of illumination of this standard. In addition, this spectrophotocolorimeter comprises a photoelectrical receiver and a processing unit which receives an electrical signal from the receiver and supplies the sought spectrophotocolorimetrical data.

In this spectrophotocolorimeter, the light source of illumination is formed from three elementary sources. Each elementary source includes a first end of a cluster of fiber optics, this end being connected to an optical system and orientable, so as to allow the orientation of the light flow produced by each of these elementary sources on the sample. The elementary sources are distributed on a circle. The second ends of the clusters of fiber optics are coupled to a sole mother source, and by the fact that the photoelectrical receiver is coupled to a second end of a cluster of receiving fiber optics of which a first end is coupled to an optical system for collecting the light flow coming from the sample.

The following characteristics taken in isolation or taken with all their technically possible combinations can also be in the colorimeter:

- the spectrophotocolorimeter comprises an electronic block including the sole mother source and the photoelectric receiver, and an optical head which includes the elementary sources and the reference sample, the optical head being connected to the electronic block by fiber optics.
- the optical head is contained in a hermetically pressurised sealed case.
- the spectrophotocolorimeter comprises three reference samples having different absorption coefficients.
- the reference samples are held in a barrel device.
- the first end of the receiving fiber optics is placed in the center of the circle on which the elementary sources are distributed.
- the optical head comprises: a flat base plate which holds the elementary sources the standard light source and an elementary source orientation device, a flat measurement plate substantially parallel to the base plate and holding the optical system of reception and the first end of the receiving fiber optic cluster, and a reference standard holding device comprising a drawer and a barrel placed between the base plate and the measurement plate and movable parallel to same.
- the base plate and the measurement plate are connected by crossbars.
- the sample holding device drawer is accessible from the outside of the optical head in such a way as to enable the execution of a reference measurement and the choice of the reference sample.

Other characteristics and advantages of the invention will stand out at the reading of an example of a realisation described hereafter with reference to the diagrams.

DESCRIPTION OF THE PREFERRED EMBODIMENTS

Figure 1:
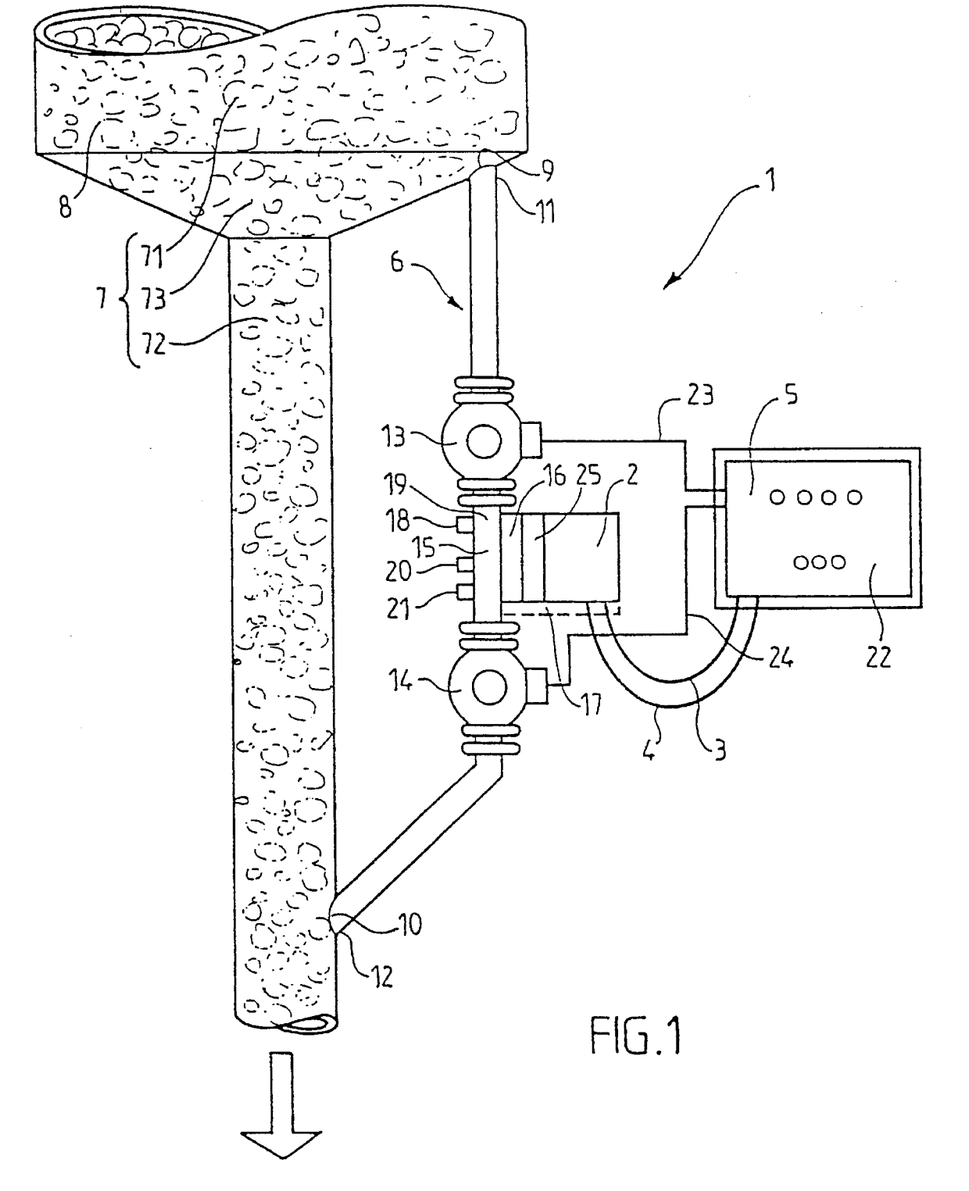
FIG. 1 shows a preferential mode of realisation of the colorimeter according to the invention.

A colorimeter 1 comprises a color measurement optical head 2 connected by fiber optic clusters 3 and 4 to a color analysis device 5, such as a spectrophotocolorimeter.

Moreover, the colorimeter 1 includes a measurement pipe 6 which by-passes a production line 7, through which flows pellets 8.

The production line 7 has an upper part 71 and a lower part 72, of smaller diameter than that of the upper part 71, and a middle section 73, slightly truncated.

In the truncated section 73, an opening 9 forms an outlet which allows pre-determined quantities of pellets 8 to be sampled from production line 7.

At a certain distance from the outlet 9, a second opening is made in the lower part 72 of the production line 7.

The measurement pipe 6 is mounted by its ends 11 and 12 respectively to openings 9 and 10, respectively.

This disposition allows a sample of pellet 8 in pre-determined quantities, to be taken through outlet 9. This sample is sent through the measurement pipe 6 and reintroduced to the production line 7 at opening 10.

The colorimetrical measurements are made while the pellet sample 8 is in the measurement pipe 6.

The measurement pipe 6 includes a first cut-off device 13 in the upper part of the measurement pipe 6 and a second cut-off device in the lower part of the measurement pipe 6. The two cut-off devices 13 and 14 define a measurement zone 15 therebetween.

In order to position the optical head 2 in relation to the sample taken of the pellets 8, the measurement pipe 6 is equipped with a window 160, the dimensions of which correspond to at least the axial area of the measurement zone 15.

According to the preferred mode shown in FIG. 1, the optical head 2 is mounted directly on the window 16. However, it is also possible for the optical head 2 to be mounted at a certain distance, or movably mounted to vary the distance, from window 16. In this case, a support 17, shown in dotted lines, is necessary.

To permit automatic or programmed operation of the colorimeter, the measurement pipe 6 is equipped, in the measurement zone 15, with a level sensor 18, situated in the upper part 19 of the measurement zone 15. Level sensor 18 permits the colorimetrical measurement cycle to launched only when a given volume of pellets is present in the measurement zone 15.

Moreover, the measurement pipe 6 is equipped in the measurement zone 15 with a temperature sensor 20 and a humidity sensor 21.

In other respects, the colorimeter 1 comprises a control device 22 connected to the cut-off devices 13 and 14 by two cables 23 and 24, respectively.

The colorimeter 1 is also equipped with a calibration device 25 which includes at least one standard (not shown). The symbolized disposition of the calibration device 25 between the window 16 and the optical head 2 refers to the operation of the colorimeter which measures at pre-determined intervals, with the characteristics of the standard acting as reference values.

It goes without saying that the color of the standard is chosen according to the color and the physical characteristics of the pellet. The same goes for the possible choice of a second or third standard.

For example, a first standard can be ideal white, and a second ideal black.

In other respects, the standards can be chosen not only according to their color, but also according to the roughness of their surface, which presents different reflectance values.

The principal operating steps of the colorimeter 1 are the following.

Pellets 8 flow through a production line 7. With the opening of the first cut-off device 13, a sample of pellets enters the measurement pipe 6 and carries on down to the second cut-off device 14, which is closed. Thus, a sample of the pellets collects and piles up in the measurement zone 15.

When the sample of pellets reaches a given volume corresponding to a pre-defined level of the measurement zone 15 as measured by the level sensor 18, the first cut-off device 13 measurement zone 15 to the pellets.

At the same time, the colorimetrical measurement cycle commences.

When the colorimetrical measurement cycle completes, the second cut-off device 14 is activated to open the outlet from the measurement zone 15. Pellets 8 to leave the measurement zone 15 to reintegrate into the pellet flow by passing through the opening 10. After a pre-defined time to free the measurement zone 15, the second cut-off device 14 closes.

Figure 2:
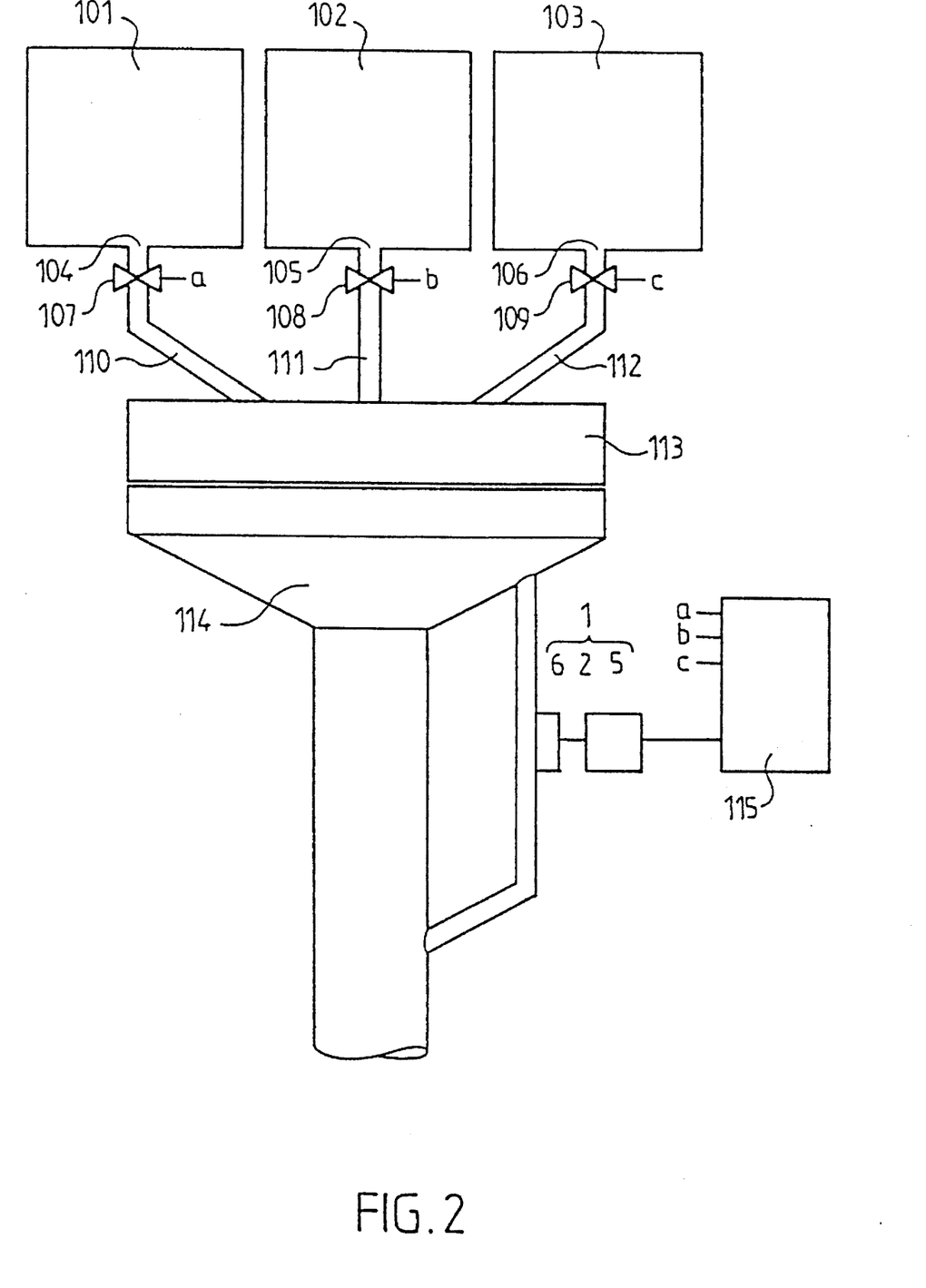
FIG. 2 shows, in a very simplified form, a colorimetrical control device according to the invention.

FIG. 2 shows, a colorimetrical control device according to the present invention. This colorimetrical control device is integrated into a pellet production installation, in which pellets are made from several different elements, each of the elements having a different color.

The pellet production installation comprises three tanks 101, 102 and 103. Each tank contains one of the elements necessary to obtain the required pellet.

Each of the corresponding outlets, 104, 105 and 106 of the tanks 101, 102 and 103 is equipped with a closing device including a means of control 107, 108, and 109, respectively. The means of control 107, 108, and 109 control the closing devices to take from each of the tanks 101, 102, and 103 variable quantities of the elements.

The taken quantities of elements flow through pipes 110, 111 and 112 towards the mixing means 113 made by a mixing tunnel.

The mixing tunnel 113 is connected to a production line 114, which transports pellets to be towards a packaging facility (not shown) or towards a production facility where objects are manufactured, for example, by injection moulding.

To be able to monitor constantly the color of the obtained composite pellets, the production line is equipped with a colorimeter 1.

The colorimeter 1 corresponding to the one described in FIG. 1, is shown in FIG. 2 only by the measurement pipe 6, the optical head 2 and the color analysis device 5.

The color analysis device 5 generates numerical data representing the color of the analysed composite pellets. This numerical data is transmitted to a processing and control device 115, to which the color analysis device 5 is connected.

Such a color analysis device 5 is preferably a spectrophotocolorimeter of the type described below.

The spectrophotocolorimeter device will now be described in more details with reference to FIGS. 3–10.

Figure 3:
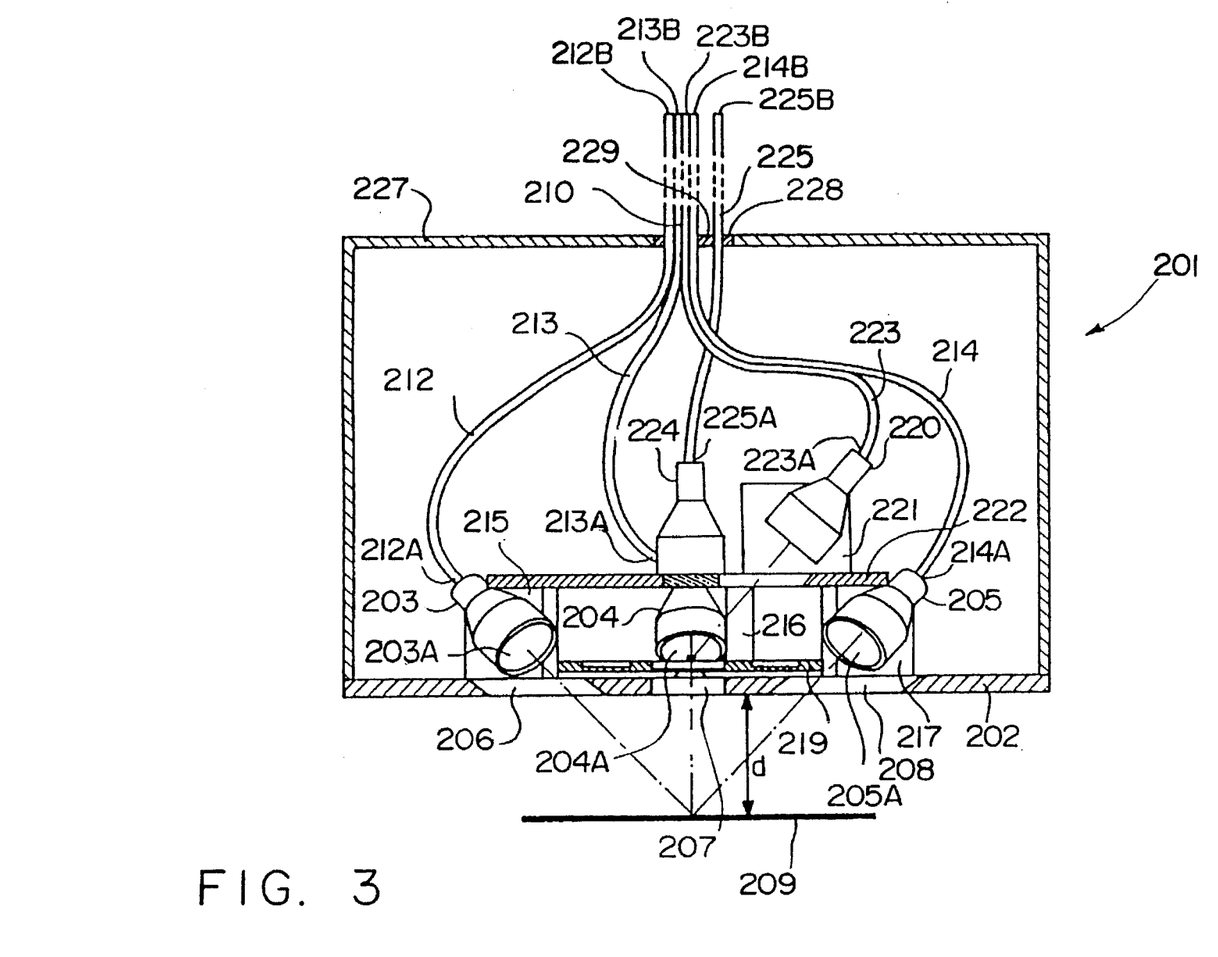
FIG. 3 shows, in a very simplified section view, a first part of a spectrophotocolorimeter in a preferential mode of realisation of the invention.

FIG. 3 shows, an optical head 201 which constitutes first part of the spectrophotocolorimeter.

The optical head 201 includes a base plate 202, on which are mounted three light projectors 203, 204 and 205, constituting elementary sources of light. Light projectors 203–205 illuminate, through three corresponding passages 206, 207 and 208 machined in the base plate 202, a sample 209 placed opposite the light projectors 203, 204 and 205 and at a distance d from the base plate 202.

Figure 4:
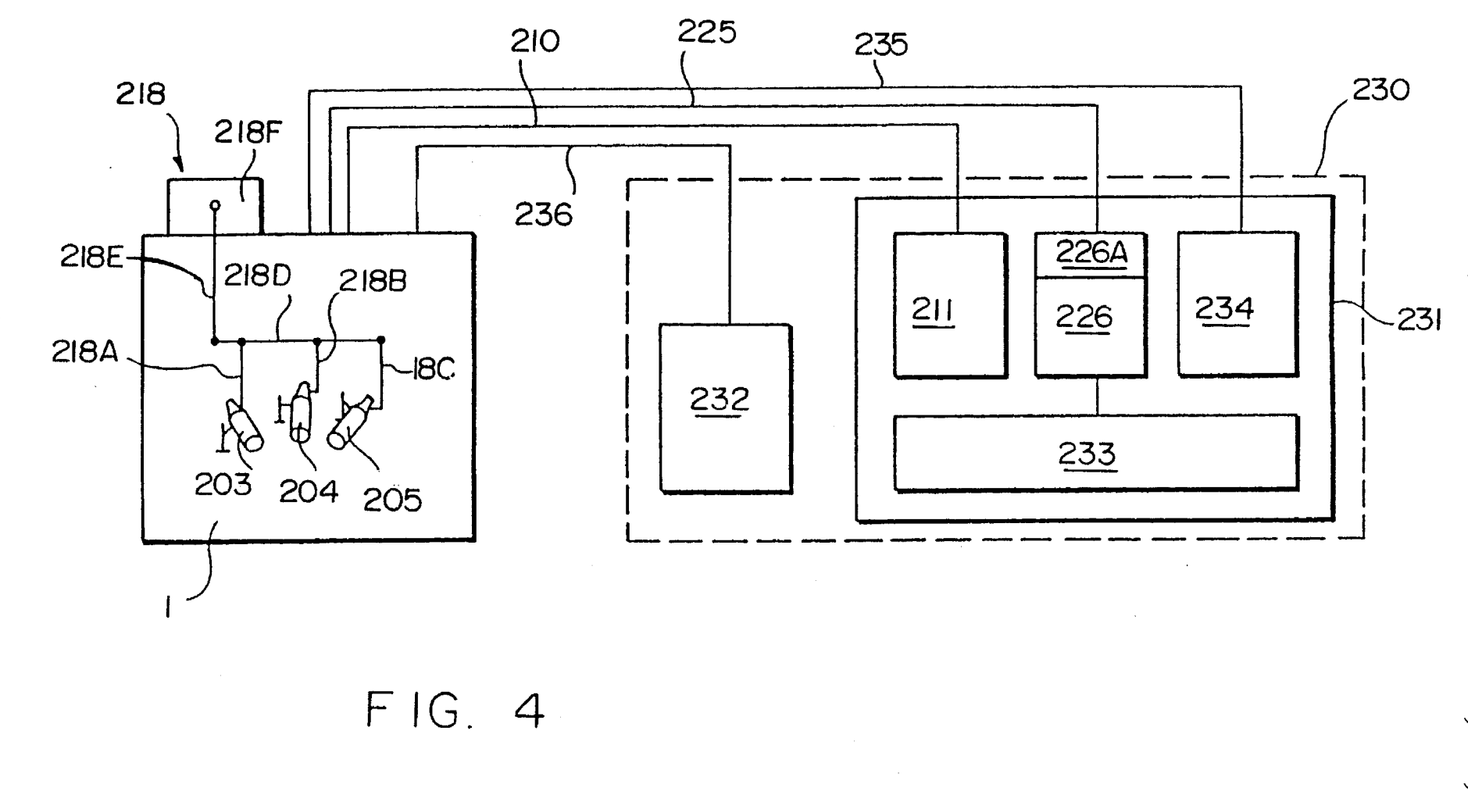
FIG. 4 shows, in a very simplified way, the whole of a spectrophotocolorimeter in the preferential mode of realisation of the invention.

The light projectors 203, 204 and 205 are connected by a first optical cable 210 to a sole light source 211 (see FIG. 4).

The first optical cable 210 is made up of four fiber optic clusters 212, 213, 214 and 223. Each cluster comprises a first end 212A, 213A, 214A and 223A and a second end 212B, 213B, 214B and 223B.

Each first end 212A, 213A, and 214A is equipped with a collimation optic 203A, 204A or 205A integrally formed with light projectors 203, 204 and 205.

The first end 223A of the fiber optic cluster 223 is equipped with a collimation optic 220A integrally formed with a fourth light projector 220 described hereinafter.

The second ends 212B, 213B, 214B and 223B are coupled together to a sole light source, or mother source, 211.

The light projectors 203, 204 and 205 are mounted movably on support plaques 215, 216 and 217, each placed perpendicularly to the base plate 202.

The orientation of light projectors 203, 204 and 205 is controlled by an orientation device 218 shown schematically in FIG. 4.

The orientation device 218 includes articulated rods 218A, 218B and 218C brought together on a central rod 218D. The central rod 218D is connected to a manipulation rod 218E, which can be controlled either manually or by an electromechanical device 218F.

The articulated rods 218A, 218B and 218C are attached respectively to projectors 203, 204 or 205.

In other respects, the optical head 201 includes a standard-holder 219 placed parallel to the base plate 202, on the same side as light projectors 203, 204 and 205.

To illuminate the standards placed on the standard-holder 219 (see FIG. 5), the fourth light projector 220 is mounted by a fourth support plaque 221, on a measurement plate 222 parallel and at a transversal distance to the base plate 202. The fourth projector 220 is supplied with light by the fiber optic cluster 223.

The measurement plate 222 also holds a collecting optical system 224 for the collection of the light reflecting from sample 209. The collecting optical system 224 is coupled optically to a first end 225A of a receiving fiber optic cluster 225 connecting the collecting optical system 224 to a photoelectrical receiver 226 (see FIG. 4), to which the receiving fiber optic cluster 225 is coupled by its second end 225B.

All the light projectors 203, 204, 205 and 220 and the collecting optical system 224 are locked by a lid 227, fixed to the rim of base plate 202, forming a hermetically sealed space. The fiber optic clusters 210 and 215 pass through the lid through an opening 228 equipped with a leakproof element 229 formed to allow fiber optic clusters 210 and 215 and of the electrical conductors (not shown) to pass through the seal.

The optical head 201 is maintained at a predetermined distance from sample 209 by a structures which are well known in the prior art, and not shown.

FIG. 4 shows, a block diagram of the spectrophotocolorimeter according to the present invention, including a first part (optical head 201), and a second part 230 of the spectrophotocolorimeter including a supply and processing optoelectronical device 231 and a compressed air source 232.

The supply and processing optoelectronical device comprises the sole light source or mother source 211 for the supply of the light projectors 203, 204, 205 and 220 of the optical head 201 and the photoelectrical receiver 226. The photoelectrical receiver 226 notably includes an optoelectronical device for the generation of electrical signals corresponding to the light reflected from the sample 209 during a measurement cycle or from a standard (see FIG. 5) during the calibration period.

The electrical signals are then sent to a data processing unit 233 to produce of a spectrophotocolorimetrical analysis standardized result.

In the care where more than one standard is used, the supply and processing optoelectronical device 231 includes a supply and electrical control device 234 connected by an electrical connection 235 to the standard-holder 219 of the optical head 201 select the desired standard.

The compressed air source 232 is connected to the optical head 201 by a pipe 236. The compressed air source 232 can be, for example, an electrical compressor or a compressed air bottle.

This disposition enables the interior of the optical head 201 to be kept under pressure sufficient to avoid the penetration of dusts or other materials inside the lid 227. This prevents dust deposting on the projectors' optics or on the collecting optical system 224.

Figure 5:
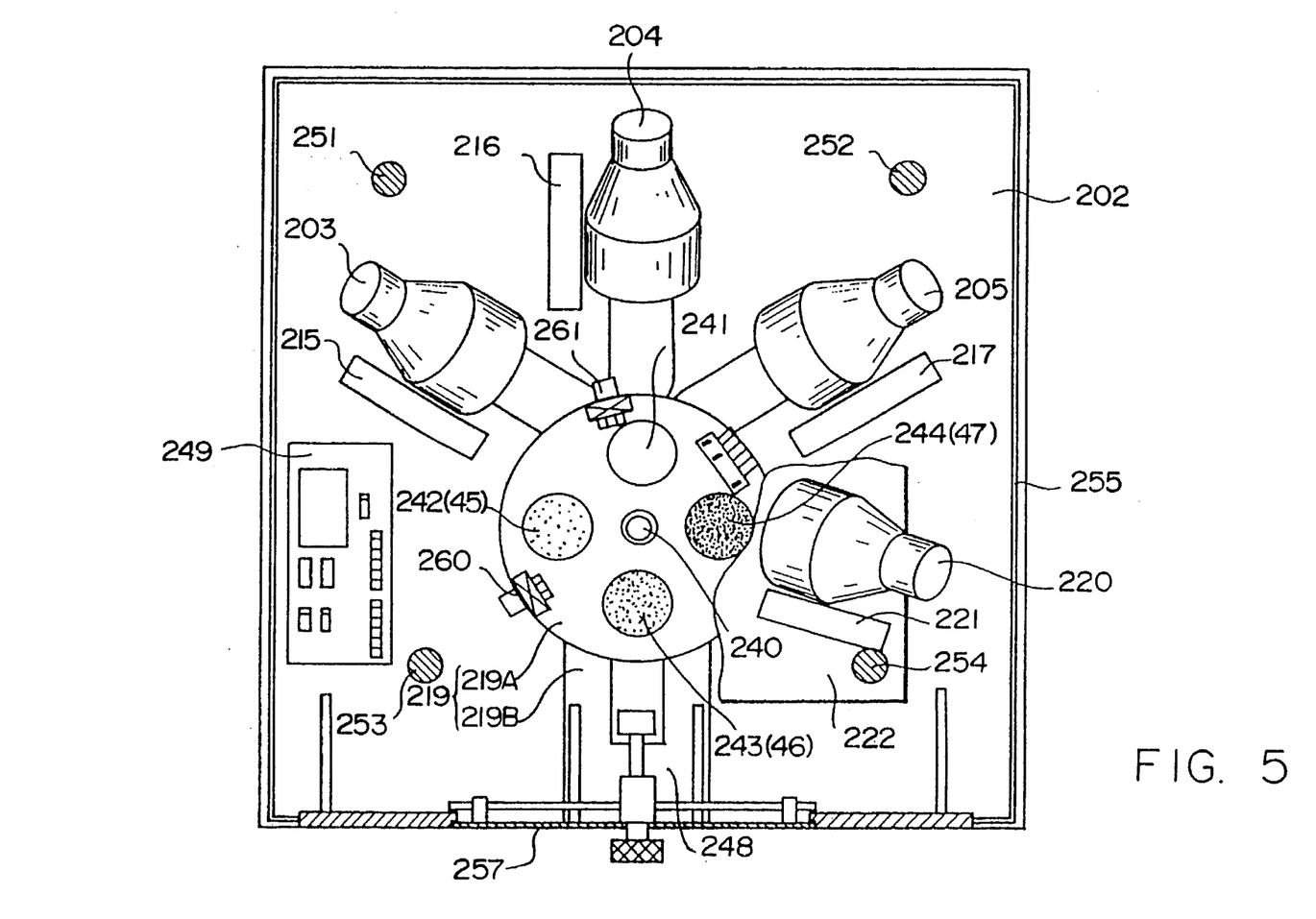
FIG. 5 shows a simplified above view of the first part of the spectrophotocolorimeter of FIG. 3 with the lid removed.

FIG. 5 shows, the inside of the optical head 201 of a spectrophotocolorimeter according to the present invention.

The base plate 202 holds the light projectors 203, 204 and 205 for illuminating a sample during its spectrophotocolorimetrical analysis.

The light projectors 203, 204 and 205 are fixed on the base plate 202 by the support plaques 215, 216 and 217.

The fourth light projector 220 is mounted on the measurement plate 222 by a support plaque 221. The measurement plate 222 is only partially shown.

The standard-holder 219 comprises a barrel 219A mounted rotatably about an axis 240 oriented perpendicularly to the base plate 202, and a drawer 219B which enables the standards to be changed. The standard-holder 219 has a recess 41 and three sites 242, 243 and 244 for the standards 245, 246 and 247 respectively.

Furthermore, the base plate 202 is equipped with a locking device 248 of the standard-holder 219 to stop standard-holder to be stopped in one of four different positions.

The first position corresponds to that shown in FIG. 5. The recess 241 is placed above the sample to be analyzed this allows the collecting optical system 224 to collect the light reflecting from the sample, which is illuminated by the light projectors 203, 204 and 205.

The second, third and fourth position are respectively those in which one of the standards 245, 246 or 247 rotates into a position above the collecting optical system 224. These three positions allow the calibration of the spectrophotocolorimeter based on the standard put in the measuring position.

The base plate 202 is also equipped with a connecting plate 249 for connecting an electrical power supply and control lines of an electrical motor 250 (see FIG. 6) to turn of the standard-holder 219.

In other respects, the base plate 202 is equipped with two fixing columns 251 and 252, which guides lid 227 into place and with two fixing columns 253 and 254, which fixes measurement plate 222 to be on the base plate 202.

A groove 255, machined along the rim of the base plate 202, supports a seal 256 (see FIG. 6) to hermetically seal of the optical head 201 after the lid 227 has been placed on the base plate 202.

A passage, 257 placed on the same rim of the base plate 202 as the locking device 248, permits the user to access the drawer of the standard-holder 219, allows the standards to be changed.

In the case of a pressurized optical head 201, the access 257 is designed to maintain, at least approximately, the pressure when access 257 is open.

Figure 6:
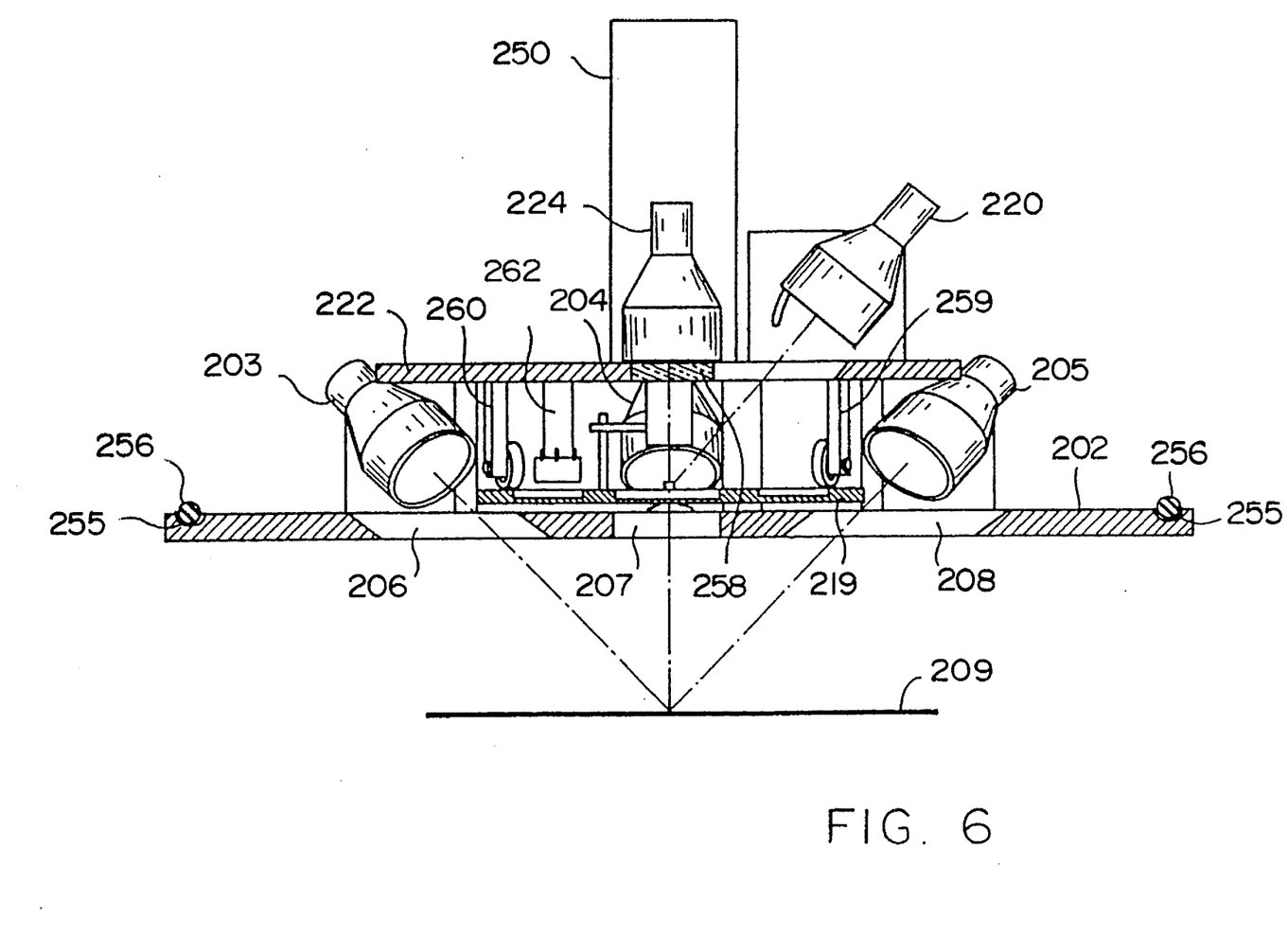
FIG. 6 shows a side view of the first part of the spectrophotocolorimeter shown on FIG. 5.

FIG. 6 is a side view of the equipped base plate 202 shown on FIG. 5. The plate 222 positions the collecting optical system 224 (which collects the light reflected from the sample 209) as well as an optical system 258, including a measurement lens. The light flow is sent through the fiber optic cluster 225 to the photoelectrical receiver 226. The sample 209 is illuminated by the light projectors 203, 204, 205, which are oriented so that their beams cross in the plane of the sample.

The measurement plate 222 is equipped, on its lower surface, with three rolling supports 259, 260 and 261 placed at 120 degrees from each other along the rim of the standard-holder 219. The three rolling supports 259, 260 and 261 press on the standard-holder 219 to keep it at a defined distance from the measurement lens 258, independent of the measurement position of standard-holder 219.

When the standard holder 219 is in a position to trigger the measurement cycle, a control signal is produced by the activation of a micro-contact 262, fixed on the lower side of the measurement plate 222, and cooperating with an unevenness machined in the standard-holder 219 for this purpose.

To carry out a spectrophotocolorimetrical measurement with the spectrophotocolorimeter according to the invention, the optical head 201 is placed in front of a measurement zone of a transparent pipe, or in front of a pipe equipped with a transparent window, through which flows a sample of the substance to be analysed.

It is also conceivable that the substance to be analysed is in the form of a strip, as for example, a paper or synthetic material strip or a flow of sheets. In this case, the strip or the sheets pass in front of the optical head 201.

The standards 245, 246, and 247 can be chosen according to color and their reflectance depending on the substance to be analysed. Nevertheless, usually neutral shade standards with different densities are used. For example, a first white, a second black and a third gray standard can be used.

Before each measurement cycle, or at least according to certain pre-defined measurements according to criteria of the repetition of the measurement, the spectrophotocolorimeter is calibrated by at least one of these standards.

Then, the light is reflected by the sample and compared with the result obtained by the calibration. The result, in the form of an electrical signal, is transmitted to a display device.

In another embodiment of the invention, the electrical signal is sent to a control device for the control of the quantities of the colored raw materials from which the substance is produced.

Figure 7:
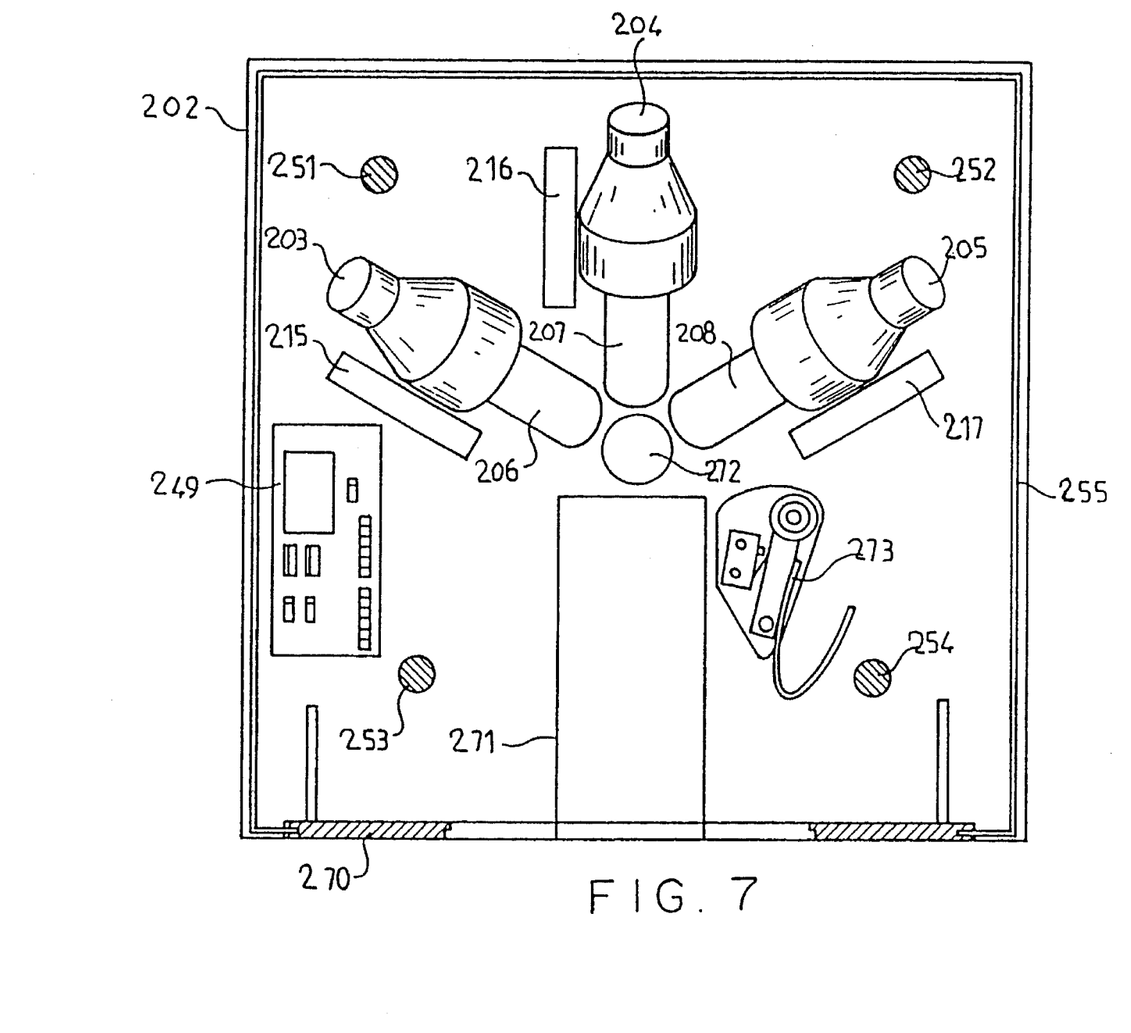
FIGS. 7, 8 and 9 show simplified above views of the different plates contained in the first part of the spectrophotocolorimeter shown on FIGS. 5 and 6.
Figure 8:
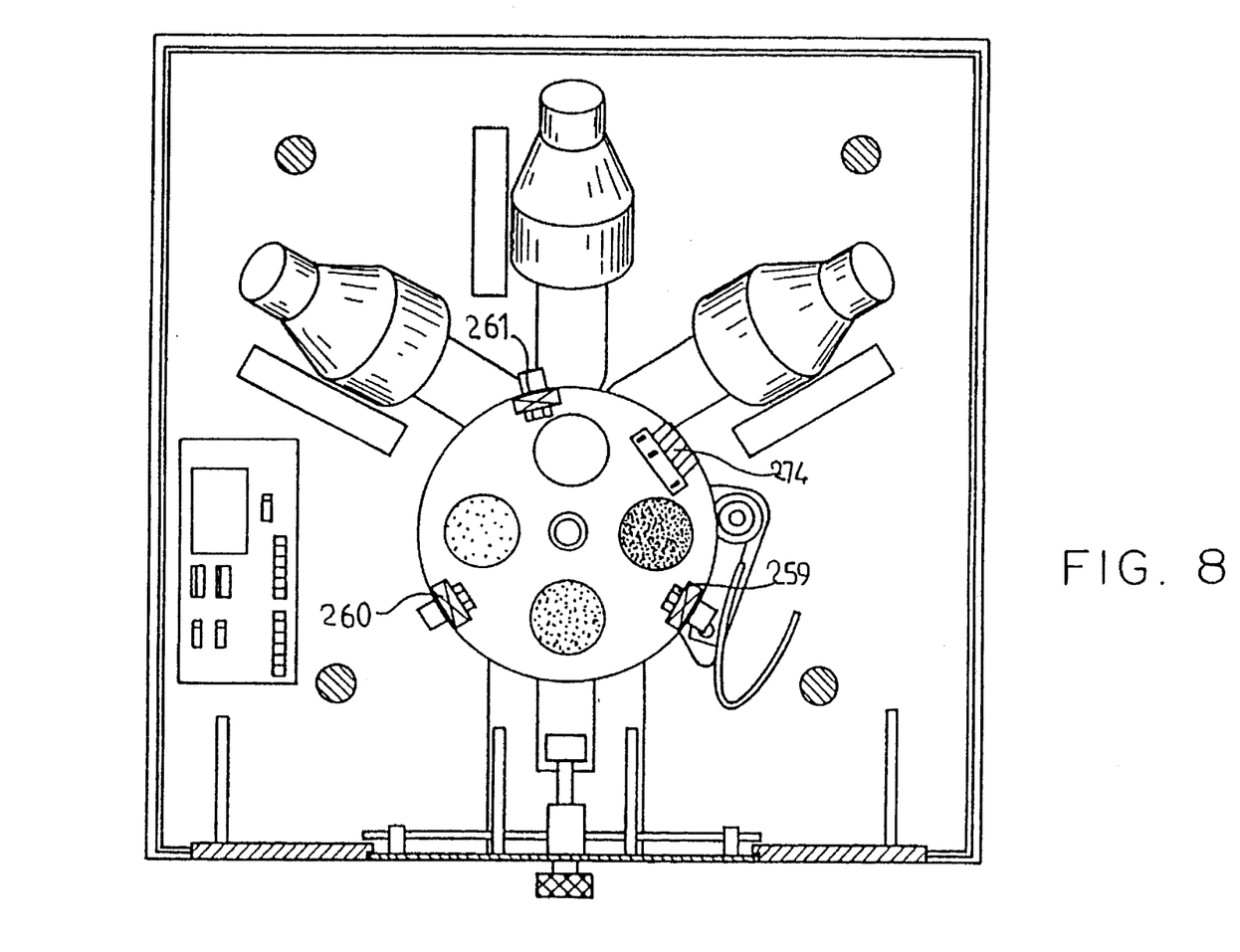
Figure 9:
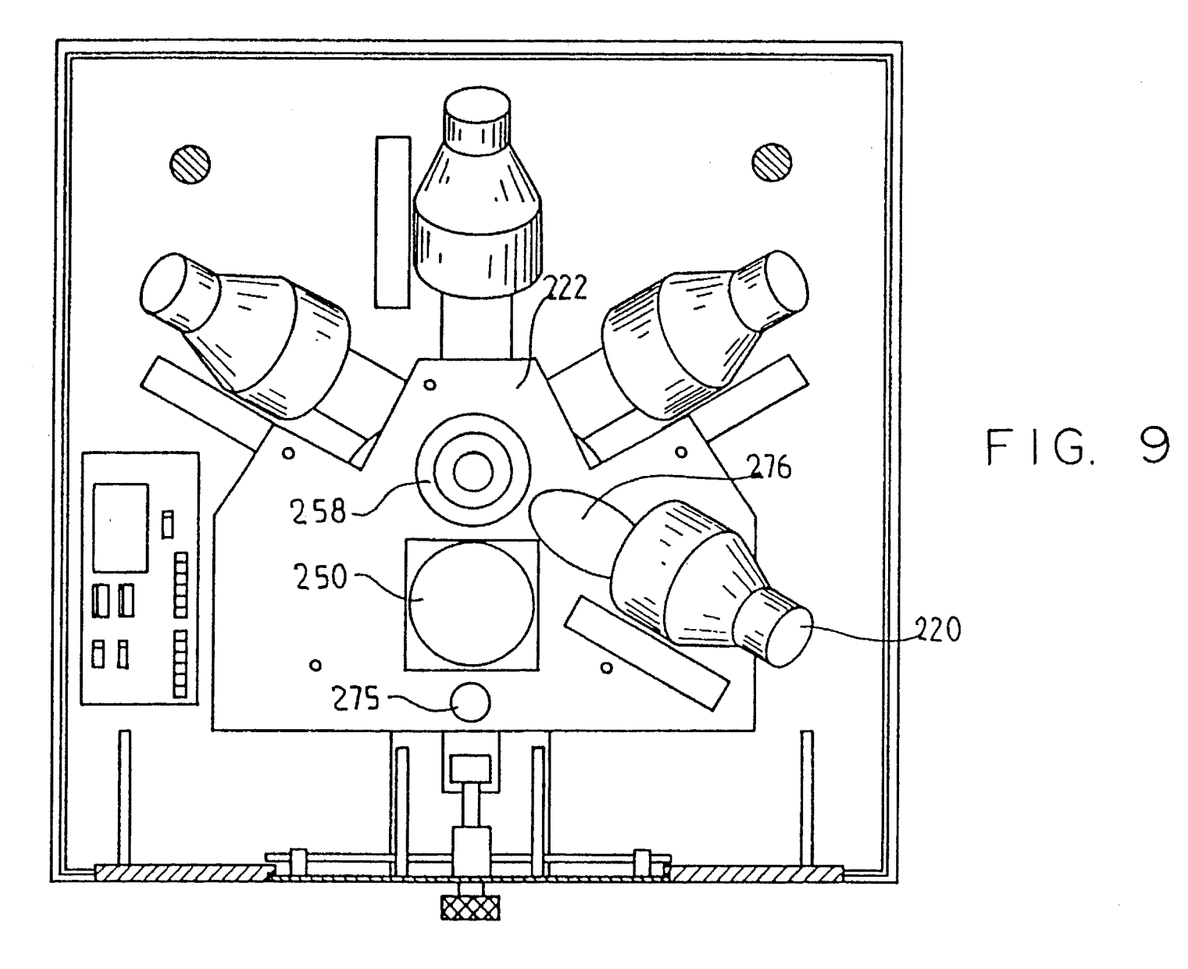

FIGS. 7, 8 and 9 show different plates contained in the first part of the spectrophotocolorimeter. For the most part, the different elements shown correspond to those described earlier in FIGS. 3 to 6. The same reference numbers are therefore used.

In addition to the description made so far, FIGS. 7, 8 and 9 show the following elements:

A connection plaque 270 which in addition to the opening 228 (or instead of) passes the different optical and electrical cables through lid 227. The connection plaque is formed so as not to cover the passage 257 for the access to the standard-holder 219.

A housing 271 for the installation of standard-holder 219.

A passage 272, machined in the base plate 202, for allowing the light reflected by the sample 209 to reach the collecting optical system 224.

A locking device 273 of the standard-holder 219.

A support 274 for the micro-contact 262.

A third column 275 for the fixing of the lid 227.

A passage 276, machined in the measurement plate 222 for allowing the light sent by the light projector 220 to illuminate a standard 242, 243 or 244.

Figure 10:
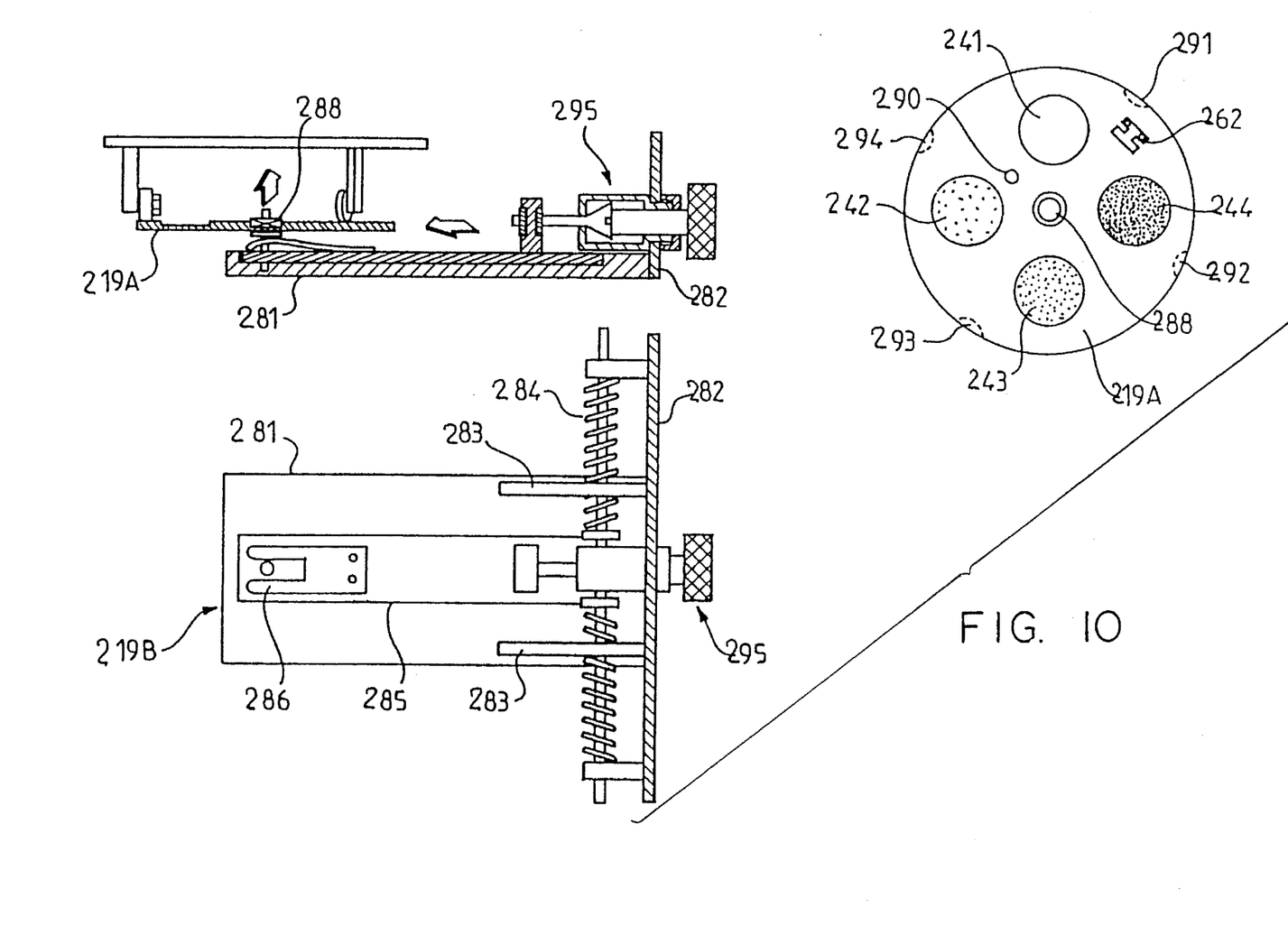
FIG. 10 shows in detail the standard-holder shown on FIG. 5.

FIG. 10 shows in detail the standard-holder 219 shown on FIG. 5. The standard-holder 219 includes the drawer 219B having a back 281 and a front 282 fixed by squares 283 on the back 281, as well as a locking system 284 which permits movement of a disk-lifter slide bar 285 ended by a spring-fork 286. The spring-fork 286 flanks a pivot 287, and can be made of phosphorous bronze.

Moreover, the standard-holder device 219 comprises the standard disk or barrel 219A with ball bearings/thrust 88, the housings 242, 243 and 244 of the standards 245, 246 and 247, respectively, the measurement hole 241, a control boss 289 to cooperate with the micro-contact 262, a driving pin 290 and four locking millings 291, 292, 293 and 294. The disk-lifter slide bar 285 is activated by a push-button 295.

In other respects, the processing and control device 115 is connected to the control means 107, 108, and 109.

According to the results of the colorimetrical analysis made by the colorimeter 1, the processing and control device 115 generates control signals, shown as a, b and c which are transmitted to the control means 107, 108, and 109.

These control signals control the outlets 104, 105, and 106 of the tanks 101, 102, and 103, respectively to vary the composition of the mix of raw materials to correct the color of the obtained composite pellets.

The processing and control device 115 can be programmed to work according to the manufacturing programs introduced according to the pellet supply orders received. However, the processing and control device 115 can also be designed with manual controls. This latter disposition would enable trial composition variations with an automatic trial record.

We claim:

1. A colorimeter for on-line color analysis of a sample of a fluid substance moving along a production line, comprising:

a measurement pipe, connected to two points along said production line, having at least one cut-off device for accumulating said sample in a measurement zone;

said measurement zone having a window;

a color measurement optical head disposed to receive light reflected from said sample through said window;

a color analysis device, connected to said color measurement optical head by a fiber optical cable, further comprising:

a level sensor disposed in said measurement zone; and said level sensor enabling a colorimetrical measurement cycle only when a predetermined quantity of said sample is in said measurement zone.

2. The colorimeter according to claim 1, further comprising a humidity sensor.

3. The colorimeter according to claim 1, further comprising:

a control device for synchronizing an opening and closing of said at least one cut-off device with a colorimetrical measurement cycle.

4. The colorimeter according to claim 1, said color measurement optical head further comprising:

three color reference standards having different absorption coefficients;

a reference light which illuminates said three color reference standards;

at least one light projector which illuminates said sample;

a collecting optical system which receives light reflected by said sample and said three color reference standards; and said at least one light projector and said reference light being connected to a sole mother source of light, and said optical system being connected to a photoreceiver, by fiber optic cables.

5. The colorimeter according to claim 4, wherein said color measurement optical head is hermetically sealed and maintained at a pressure higher than a surrounding external environment.

6. The colorimeter according to claim 4, further comprising a rotatable barrel for supporting said three color reference standards.

7. The colorimeter according to claim 4, wherein said fiber optic cables are centered with respect to said at least one light projector.

8. The colorimeter according to claim 4, further comprising:

a base plate on which said at least one light projector and said color reference standards are movably mounted;

a measurement plate, disposed substantially parallel to said base plate, supporting said collecting optical system; and a barrel and drawer for supporting said three color reference standards between, and movable parallel to, said base plate and said measurement plate.

9. The colorimeter according to claim 8, wherein said base plate and said measuring plate are connected by crossbars.

10. The colorimeter according to claim 9, wherein said drawer is removable from said optical head.

11. A colorimeter for the on-line color analysis of a sample of a substance moving along a production line and having a pre-determined color, said substance being formed in a mixing area from at least first and second raw materials contained in at least first and second storage areas, respectively, comprising:

a measuring pipe, connected to two points along said production line for diverting said sample off and returning it to said production line, and having at least one cut-off device for accumulating said sample in a measurement zone;

said measurement zone having a window;

a color measurement optical head disposed to receive light reflected from said sample through said window;

a color analysis device, connected to said color measurement optical head, for comparing a color or said light reflected from said sample against said pre-determined color; and at least first and second means for regulating, responsive to said color analysis device, a flow of said at least first and second raw materials, respectively, into said mixing area.

12. An apparatus for measuring the color of a sample of a substance moving along a production line, comprising:

a path connected to two points along said production line for diverting said sample off and returning it to said production line;

said path having a first cut-off device and a measurement zone, said first cut-off device controlling accumulation of said sample in said measurement zone;

at least a portion of said measurement zone being transparent;

a temperature sensor, a humidifier sensor, and a level sensor effective to monitor an environment of said measurement pipe;

at least one light projector for projecting light on said sample through said at least a portion of said measurement zone;

a photoelectric receiver for receiving light reflected from said sample;

a comparator effective to compare a color of said light reflected from said sample against a pre-determined color;

three color reference standards;

a calibration light source for protecting light on said three color reference standards;

said photo receiver receiving light reflected by a selected one of said three color reference standards; and means for calibrating said comparator based on said light reflected by said selected one of said three color reference standards.

* * * * *